(12) United States Patent
Smith et al.

(10) Patent No.: US 11,724,210 B2
(45) Date of Patent: Aug. 15, 2023

(54) HEAT SINK EVAPORATOR

(71) Applicant: Katz Water Tech, LLC, Houston, TX (US)

(72) Inventors: Paul L. Smith, Katy, TX (US); Gary P. Katz, Houston, TX (US)

(73) Assignee: Katz Water Tech, LLC, Houston, TX (US)

( * ) Notice: Subject to any disclaimer, the term of this patent is extended or adjusted under 35 U.S.C. 154(b) by 0 days.

(21) Appl. No.: 17/467,403

(22) Filed: Sep. 6, 2021

(65) Prior Publication Data

US 2022/0072445 A1 Mar. 10, 2022

Related U.S. Application Data

(60) Provisional application No. 63/075,175, filed on Sep. 6, 2020.

(51) Int. Cl.
| | |
|---|---|
| *B01D 1/00* | (2006.01) |
| *B01D 5/00* | (2006.01) |
| *C02F 1/04* | (2023.01) |
| *C02F 1/00* | (2023.01) |
| *F28D 7/16* | (2006.01) |
| *F28D 21/00* | (2006.01) |
| *C02F 103/10* | (2006.01) |

(52) U.S. Cl.
CPC ......... *B01D 1/0017* (2013.01); *B01D 1/0082* (2013.01); *B01D 5/006* (2013.01); *C02F 1/008* (2013.01); *C02F 1/048* (2013.01); *F28D 7/1607* (2013.01); *C02F 2103/10* (2013.01); *C02F 2209/02* (2013.01); *C02F 2303/10* (2013.01); *F28D 2021/0064* (2013.01)

(58) Field of Classification Search
CPC .. C02F 1/008; C02F 2103/10; C02F 2209/02; C02F 2303/10; C02F 1/048; F28D 7/1607; F28D 2021/0064; B01D 1/0017; B01D 1/0082
See application file for complete search history.

(56) References Cited

U.S. PATENT DOCUMENTS

| | | | | |
|---|---|---|---|---|
| 36,849 | A * | 11/1862 | McKee | B01D 1/22 159/13.1 |
| 2,855,346 | A * | 10/1958 | Williamson | C02F 1/04 203/DIG. 17 |
| 11,034,605 | B2 * | 6/2021 | Katz | B01D 5/0015 |
| 2016/0258266 | A1 * | 9/2016 | Frick | B01D 3/007 |
| 2020/0009471 | A1 * | 1/2020 | Meghanathan | B01D 17/02 |
| 2020/0206651 | A1 * | 7/2020 | Frick | B01D 1/0058 |
| 2021/0031121 | A1 * | 2/2021 | Peter | B01B 1/00 |

FOREIGN PATENT DOCUMENTS

WO WO-2011148178 A2 * 12/2011 ............... F01N 5/02

* cited by examiner

*Primary Examiner* — Jonathan Miller
(74) *Attorney, Agent, or Firm* — Gary P. Katz; Katz Law Group, LLC (57) ABSTRACT

An evaporator apparatus, system, and method can be utilized for separating, purifying, and refining contaminated fluids. The evaporator comprises a burner, a conically shaped heat sink to form an evaporate from the fluids with profiles arranged on the liquid contacting surface a unique multiple surfaced apparatus for collecting the evaporate, condensing the evaporate as purified water separating it from the evaporator, a device for collecting the unevaporated brine.

19 Claims, 7 Drawing Sheets

HEAT SINK EVAPORATOR

CROSS-REFERENCE TO RELATED APPLICATIONS

The present application is a new United States Non-Provisional Patent Application claiming priority to U.S. Provisional Patent Application 63/075,175 entitled "HEAT SINK EVAPORATOR" with confirmation number 1008, filed on Sep. 6, 2020. U.S. Provisional Patent Application Ser. No. 63/075,175 is hereby incorporated by reference.

FIELD

The present disclosure relates generally to devices and methods for extracting components from a fluid. More particularly, the embodiments relate to devices and methods for using physical processes such as heat and/or pressure or chemical processes to process fluids, extract components, and obtain favorable chemical compositions of the components. Most specifically, the invention relates to devices and methods to purify water at industrial sites including oil and gas well sites using evaporation and heat energy.

BACKGROUND OF THE INVENTION

Evaporation and distillation are two commonly used methods to separate liquids that are mixed, to separate liquids from solids, and to separate solutes dissolved in the liquids. Usually, different liquids have different properties such as boiling temperatures or different volatilities which allows for a separation step. The volatility of a substance is related to its vapor pressure and is the tendency of a substance to vaporize, or in other words transition from liquid to vapor phase. If several different liquids are mixed, one kind of liquid can be separated from another by heating and collecting the evaporate based on each component's different temperature volatility for vapors and density differences for liquids. The collected evaporates are later cooled as condensation and separated into the distinct liquids. Evaporate can form from heating a liquid to a temperature below its boiling point.

Contaminated water containing impurities can be refined using various devices and methods to separate the different compounds and elements from the pure water, which is usually referred to as separation. Evaporators are commonly used to separate pure water from contaminants dissolved in the water by heating the water to a temperature sufficient to cause evaporation to take place. The water evaporates is then collected and condensed back into the liquid phase as purified water. The remaining solids and solutes can be disposed of or utilized. Evaporators are also used to make steam from pure water when no other liquid compounds, solutes are contained in it. The steam can be utilized for various purposes such as cleaning, power for steam engines, or other known uses of steam without being condensed.

Evaporators use different sources of energy, typically, in the form of heat to separate the pure water from the contaminates or other liquids during the evaporation procedure. Many evaporators use electrical energy. Electric coils can be placed directly in contact with liquid and then an electric current is produced through the coils to a point where the liquid is raised to the boiling point. Electrical coils generally require significant amounts of costly electrical energy. Burning of combustible gases is also used in evaporators to generate the heat required to boil a liquid, either contaminated with solids, mixed with other liquids, or just to generate steam from pure water. Some evaporators pass the liquid in the form of droplets directly into the flame of the burning gas to evaporate the liquid. This results in the flue gas components mixing and sometimes reacting with the vapor components which can increase air pollution. There are also other apparatuses and methods known to those skilled in the art to separate liquids and solids to collect or utilize the evaporate.

Hydrocarbon wells produce by-products other than oil and gas throughout the extraction process. Contaminated water and natural gas are common by-produced of these hydrocarbon wells. Typically, the volume of contaminated water is more than the volume of oil. In Texas, for example, for every volume of oil produced there are eight volumes of contaminated water produced. The ratio can be as high as 20 barrels of water for every 1 barrel of water. This contaminated water is then either disposed of by reinjection into the ground in disposal wells or is transported offsite via pipeline or water truck to be treated at purification centers.

The contaminated water produced at the well site contains solids such as sands and metals. The contaminated water also has dissolved salts commonly known as brine. It can contain other dissolved compounds as well. The solids can be filtered using mechanical means such as filters, centrifuges, or other known means such as reverse osmosis membranes. Evaporators can be used to purify this contaminated water by-product produced at hydrocarbon wells. Natural gas is also produced as a byproduct during oil extraction. Frequently, this natural gas is burned at the well site known as flaring because laws and regulations prohibit the gas from being vented or released directly into the atmosphere. Often, there is no method readily available pipelines or other means to transport the gas to market or a refiner to use a feedstock. Sometimes, the gas is reinjected into the ground as a disposal method. Worldwide, trillions of cubic feet of natural gas are flared each year because there is no alternative method available to handle the produced gas.

Problems can arise when heavily contaminated or corrosive solutions are separated by evaporation using an apparatus designed for low contaminated solutions or pristine liquids. For example, it would not be efficient to use an evaporator designed for making steam out of water. It would also be difficult to use an evaporator designed to collect the condensed evaporate as the desired product leaving only a small residue of undesired unevaporated liquid.

Existing evaporators are often designed for permanent installation into a building away from the well site making it necessary to transport the contaminated produced water to the facility. Transportation of water can be a costly component of managing water. There is a need for an evaporator apparatus designed specifically for handling the contaminated produced water from hydrocarbon wells at the well site in an efficient manner, using the waste energy of flared gas and collecting the concentrated, unevaporated liquid as the desired product. Embodiments of the invention, described below, addresses these needs.

SUMMARY OF THE INVENTION

Embodiments of the invention generally relate to an evaporator for evaporating, separating, and purifying contaminated water. This contaminated water can be contaminated with brine water, a by-product produced during hydrocarbon production. In one embodiment, the invention contains a burner, a conically shaped heat sink to form an evaporate, a unique multiple surfaced apparatus for collecting the evaporate, condensing the evaporate as purified water separating it from the evaporator, a device for collecting the unevaporated brine and monitoring the salt concentration of the unevaporated brine. Embodiments of the invention also generally relate to using natural gas produced from hydrocarbon producing wells as a byproduct to generate the heat required to perform this operation. More importantly, embodiments of this invention relate to specific elements of an evaporator used to separate purified water from contaminated produced water brine by using produced natural gas that is flared.

A method embodiment is disclosed. In one embodiment, the method comprises 6 steps. First, a combustible material using a burner creates a flue gas. Second, heat from the flue gas of burned combustible material is transferred to a frustoconical heat sink. Third, fluid flows onto the water surface of the heat sink. Fourth a heat sink is used to transfer heat to evaporate a portion of the water as vapor. Fifth, the vapor is removed from the heat sink. Finally, the fluid water is removed from the heat sink.

An evaporation system is disclosed. In one embodiment, the evaporation system uses temperature sensors on the evaporator in coordination with the gas supply and fluid flow to control the water evaporation process in a coordinated manner using a control system.

BRIEF DESCRIPTION OF THE DRAWINGS

The foregoing is intended to give a general idea of the invention and is not intended to fully define nor limit the invention. The invention will be more fully understood and better appreciated by reference to the following description and drawings.

DETAILED DESCRIPTION

Before describing selected embodiments of the present disclosure in detail, it is to be understood that the present invention is not limited to the embodiments described herein. The disclosure and description herein are illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and disclose presently preferred embodiments to one of skill in the art but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", "first", "second", and so forth are made only concerning explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

The liquid to be separated in this invention is generally contaminated produced water with the solids and sands removed, generally considered saltwater or brine. The embodiment, shown in FIG. 1, relates to an evaporator system 1 to evaporate and then separate pure water as vapor away from denser water containing salts which at higher concentrations is known as brine or reject wastewater.

This embodiment is useful for contaminated water that is produced at hydrocarbon well sites after solid contaminants have been removed but can be used with other applications such as industrial wastewater and sea water desalination. The solids are typically removed by filtering including cartridge filters and gravity media filters using water handling equipment which includes equipment for processing, transporting, and storing water at the hydrocarbon producing well sites. The hydrocarbon well sites can be oil or gas wells whether they be an onshore well site or an offshore well site. The invention separates a liquid by heating it to increase the evaporation rate, separating the vapor and then collecting the unevaporated liquid, collecting the vapor, condensing the vapor, and collecting the condensate. More specifically, in one embodiment, this invention heats contaminated water such as a salt brine to increase the evaporation rate.

The evaporation rates are generally close to or at the boiling temperature or to a temperature high enough to produce condensable vapor out of the brine. The temperature can be reduced by placing the evaporators at pressures less than atmospheric. This can be accomplished using a mechanical compression or vacuum pumps. Preferably the pressure should be at least less than 0.9 bar, more preferably, less than 0.7 bar and most preferably less than 0.5 bar. The pressure should not be reduced significantly more than 0.1 bar to avoid a near-vacuum situation which may cause issues such as, container collapse.

In one embodiment, alternative flow paths allow the lighter vapor to separate from the heavier solids using gravity and the density differences between the components. Without alternative or multiple flow paths the vapor energy can carry solid contaminates in a physical property known as entrainment. Therefore, a closed loop system will not allow effective and consistent separation of the vapor from contaminates that occurs in an open system with alternative flow paths or multiple flow paths. Very often, in a closed loop system the water contaminates quickly dissolves back in the water as it is condensed because there is no separation. This very often happens in a traditional heat exchangers and boiler systems.

Another method to increase evaporation rates is to increase surface area. The more surface area the water or fluid the quicker the water or fluid can evaporate. The surface area can be increased by creating water droplets. On method is to spray the fluid onto the heat sink using a nozzle or aerator. This can be accomplished by forcing water through a fine mesh under pressure. Gas, such as air under pressure can often be used to help atomize the water or fluid. Another is to engineer a plurality of holes to cause water droplets during natural gravity flow.

After evaporation or vaporization, the vapor is typically separated from the brine. The evaporate and the un-evaporated brine are then separately collected. The invention can be used to separate purified water from the brine water by using the evaporation process. The purified water generally contains little or no salts. The water should preferably contain less than 2,000 parts per million (PPM) of total dissolved solids (TDS), even more preferably less than 1,000 PPM of TDS and most preferably less than 500 PPM of TDS. As discussed above, vapor, in a property known as entrainment, can have enough energy to carry some salts in the molecules. Using internal baffles or complex geometries or multiple flow paths can help reduce the vapor energy enough to stop carrying solids and allow gravity to naturally separate the contaminates due to density difference. It may be necessary to filter the vapor using a mechanical filter or membrane to remove the salts. Alternatively, the process can be repeated multiple times to remove any entrained solids or salts.

Figure 1:
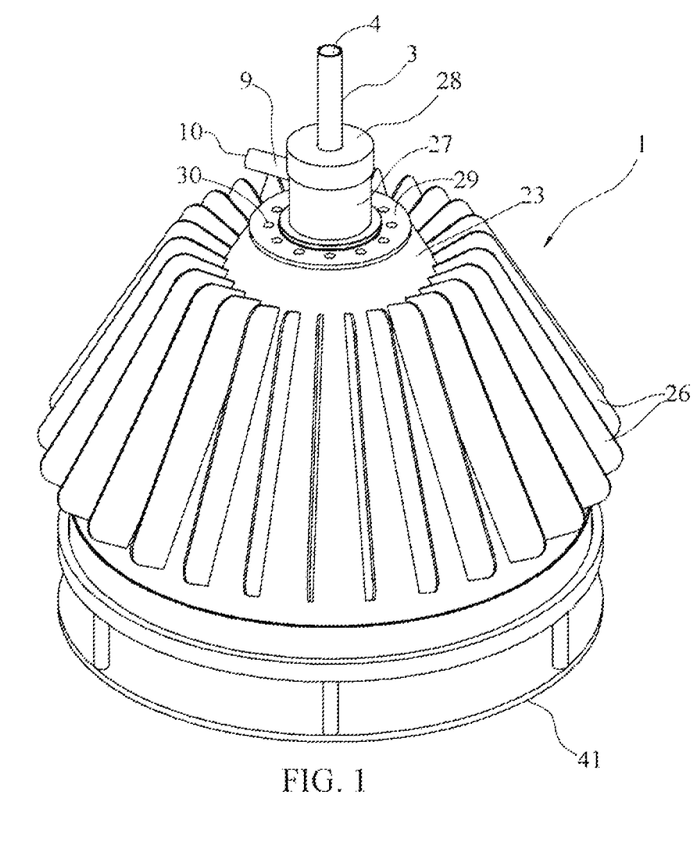
FIG. 1 is an exterior perspective view of the evaporator system.

After evaporation, the device is shown in FIG. 1 condenses the evaporated liquid in the form of vapors by cooling the vapors to a temperature low enough to cause a phase change from gas to liquid. In one embodiment, the device heats a liquid that is input into the evaporator 1, evaporates some of the liquid in the form of vapor, condenses the vapor, and removes the un-evaporated liquid. Novel elements of this invention are described in detail below which enable the heating, evaporation, condensing, and separation of contaminated water such as, produced water brine to be performed with novel features. These novel features provide efficiency gains and enable an operator to control the brine density during the process, as described below. The biggest efficiency gains, generally come from the energy recapture systems, as described in the embodiments below.

The evaporator system 1, shown in FIG. 1, heats the contaminated water by burning gas. This gas can be supplied as natural gas supplied from tanks or pipelines. The gas supplied to the evaporator 1 could be propane, methane natural gas, compressed natural gas (CNG), flare gas, liquid petroleum, any type of fuel that could be burned, and combinations thereof. Preferably, the gas is produced natural gas at the well site, typically, the gas is then either sent to a pipeline, flared off, or reinjected into the ground. Alternatively, the energy source can come from waste heat energy or solar thermal energy being flowed or pumps through the evaporator system 1, similar to how the natural gas and flue gas flows through the evaporator system. Such as system can be an open loop system wherein the waste heat energy or flue gas is vented into the atmosphere or a closed loop system wherein the heat transfer medium such as solar thermal fluids or cooling water is pumped continuously through the closed loop system.

Contaminated water from the well site or other source can be supplied to the evaporator 1 from onsite storage or can be supplied directly from the well or industrial plant. Typically, the contaminated water is stored in tanks or lined ponds. The purified water output from the invention can be either stored on-site in tanks or ponds to be reused for well site purposes or can be transported away from the well site by pipeline or trucks for offsite uses. Alternatively, if the water is pure enough, it can be discharged which can beneficially recharge depleted waterways. The discharge will require meeting all state and federal chemical requirements and typically will require a discharge permit from the appropriate governmental agency. The concentrated brine output product can be used onsite for drilling fluids or completion fluids or can be transported offsite by any known methods to be used for other purposes. Other purposes include selective removal of metals or crystallization to create a solid salt which can be used as food grade salt (if there are no impurities), pool salt, or road salt.

FIG. 1 illustrates the outside of the evaporator system 1 and is shown in an isometric, operational upright position. When referring to the top or upper and bottom or lower, the evaporator 1 is in the position shown in FIG. 1 and is in the standard operating position. When referring to vertical and horizontal, the evaporator system 1 is also in the position shown in FIG. 1, in the standard operating, upright position. The general shape of the evaporator 1 is frustoconical with the smaller diameter of the evaporator 1 at the top or surface 23 and the larger diameter at the bottom or support stand 41. The invention's overall size can vary, but in practice, the size would be favorable to be placed on a skid or trailer for ease of transportation to the well site. However, the invention could be modular and assembled onsite. The evaporator system 1 could be placed on other foundations other than a skid such as a trailer, truck, or placed directly on the ground. Multiple evaporator systems 1 could be used in series or parallel to meet the requirements of the well's produced water output. A lightweight and smaller sized evaporator could be built for personal individual uses including camping, military, and remote humanitarian mission.

Other equipment needed outside the evaporator 1 not shown may include pumps, pipelines, pre-treatment systems including filtering equipment, containers for storing the separated components, testing equipment, monitoring equipment, safety equipment, fuel supply, storage equipment, other equipment needed to supply heat and liquid to the evaporator 1, devices to channel input and output fluids to and from the evaporator 1 or to control the operation of the evaporator system 1 and combinations thereof.

Figure 2:
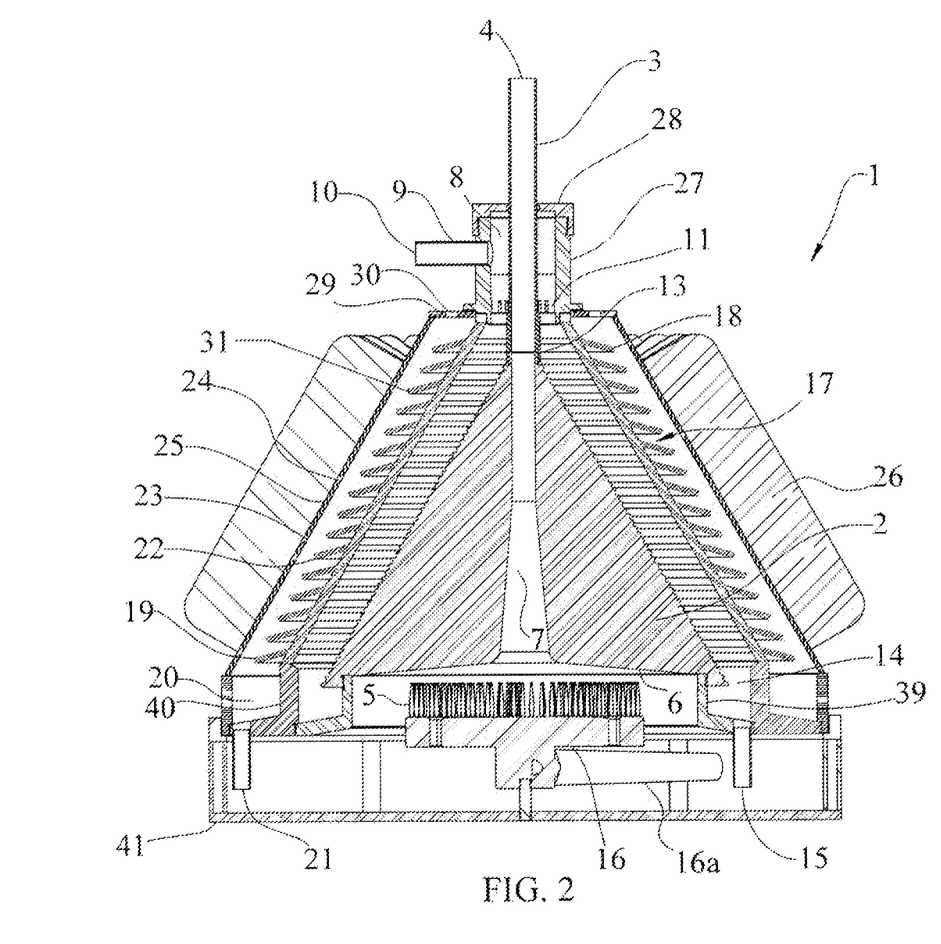
FIG. 2 is a full sectional view of the evaporator system in the upright position.

In more detail, FIG. 2 shows the internal features of the evaporator 1 is a sectional view. similar elements of FIG. 1 and FIG. 2 have the same reference numbers. Central to the evaporator 1 is the generally frustoconical shaped heatsink 2 which is shown inside the heat exchanger. The heatsink 2 has a bottom surface 6. The bottom surface 6 may be flat with a planal surface or the surface 6 can be non-planar, tapering upward toward the center which is the preferred embodiment. Surface 6 could also have heat transfer fins, not shown, to increase the heat transfer area between surface 6 and a heat source. Below the bottom surface, 6 is a burner 16. The burner 16 is supplied with flammable gas. Alternatively, the burner can be replaced with a fan (not shown) or a pump (not shown) to move a heat transfer medium instead of flammable gas through the evaporator 1. The heat transfer medium can be gas, water, oil, or synthetic fluid, or combinations thereof.

The gas can be supplied to the burner 16 with gas tubing 16a from gas tanks or supplied by pipe or pipelines not shown. It can be natural gas or propane, or any commonly burnable gasses used to supply heat when burned. In the preferred embodiment, the burner 16 burns gas produced from the well as a by-product of oil production. In FIG. 2, flame 5 is the burning gas supplied to the evaporator 1. Holes or orifices, not shown, in the top surface of burner 16 ejects or flow the gas in a controlled and distributed manner to supply the fuel necessary, that when ignited produces flame 5. The orifices can be arranged in a pattern to distribute flame 5 over a substantial area of bottom surface 6 to effectually transfer heat produced from flame 5 to the bottom surface 6 in a designed manner. The bottom of evaporator 1 can be open to the environment to supply needed oxygen for flame 5. The bottom of evaporator 1 may also be closed off, isolating burner 16 from the environment, the needed oxygen supplied by blowers and vents not shown.

A heatsink is generally a device that has a capacity of absorbing, transferring, or giving up heat. Heat capacity is defined as the amount of heat that can be supplied to a given mass to produce a unit change of temperature. Therefore, the greater the mass of a body, the greater the amount of heat the body can absorb for every unit change in temperature. Increasing surface area of the heat sink or fluid flow on the surface of the heat sink can increase heat transfer rates.

The amount of heat that can be absorbed for every unit change of temperature also depends on the properties of that material. Given the same mass, some materials increase more or less in temperature than other materials given the same amount of heat supplied to it. For example, if the first body of mass made of one material increases less in temperature than a second body with the same mass of a second material when the same amount of heat is supplied to it, the heat capacity of the first body is greater. Alternatively, the first body did not increase in temperature as much as the second body for the same amount of heat because its heat capacity is greater. The first body with a greater heat capacity than a second body will produce a smaller unit temperature increase given the same amount of heat supplied for the same mass. Likewise, the first body with a greater heat capacity than a second body will produce a smaller unit temperature decrease when a given amount of heat is given up from the bodies for the same mass. For example, in the temperature range of 15 to 35 degrees Celsius, it takes about 450 joules of energy to raise the temperature of one kilogram of iron one-degree Kelvin. In comparison, it takes about 4200 joules of energy to raise one kilogram of water one-degree Kelvin in the same temperature range.

The principle of heat capacity is considered when designing a device having a heatsink that needs to absorb a large amount of heat or give up a large amount of heat and a small change in temperature as possible is desired. The heat capacity is often measured in the SI unit of heat capacity of joule per kelvin (J/K) or (J/mol/K). Preferably, the heat exchanger should have a heat capacity rating of at least 30, more preferably at least 80, even more preferably at least 100 and most preferably above 200 as measured in J/mol/K. Some values of specific heat capacity for materials considered for use in joules per kilogram per degree Celsius are: iron—449 J/(kg C°); steel—490 J/(kg C°); copper—385 J/(kg C°); aluminum—897 J/(kg C°); bronze—370 J/(kg C°); or magnesium—1050 J/(kg C°). The heatsink 2 in this invention is designed with sufficient mass, sufficient surface area and with materials such that a sufficient amount of heat is absorbed and given off with the desired amount of temperature change.

As shown in FIG. 2, internal of heatsink 2 is a venting flow path 7 or venturi that runs generally along a vertical central axis of the heatsink 2, extending from bottom surface 6 to heatsink top 13. Exhaust gasses from flame 5 are vented up through flow path 7 into exhaust pipe 3 and out exhaust outlet 4. Heatsink 2 can be made from any material with a high heat capacity property, or high thermal conductivity, such as, ferrous steel, copper, copper alloy, aluminum, aluminum alloy, exotic alloys, or made from corrosive a resistant metal which is the preferred embodiment. The thermal conductivity is typically measured as a coefficient "k" using the equation (W/m K). Typical unit conversions include: 1 W/(m K)=1 W/(m ° C.)=0.85984 kcal/(h m ° C.)=0.5779 Btu/(ft h ° F.)=0.048 Btu/(in h ° F.)=6.935 (Btu in)/(ft$^2$ h ° F.). The thermal conductivity should be at least 40, preferably above 50, more preferably above 100, and most preferably above 200.

The purpose of the heatsink 2 is to absorb a large amount of heat supplied from the burner 16. The size and material of the heatsink 2 are designed so the heat capacity is at a value high enough to produce a temperature drop within acceptable levels for any heat given up by the heatsink 2 when transferred to a liquid during evaporation. However, the invention does not limit the heatsink 2 to be constructed using those metals but can be made from any material meeting the physical requirements of heat capacity, temperature, and corrosion. The heatsink 2 could be cast or machined to the desired shape or can be made of two or more materials. The heatsink 2 could be manufactured with a base or core material and then a surface material or coating applied to prevent corrosion. The coating can be a high heat paint coating such as Rust-oleum, graphene, or ceramic coating for higher temperatures. The heatsink 2 can be made from many materials and can be constructed by numerous specific methods including manufacture by numerous feasible methods known to those skilled in the art.

Figures 3, 4, 5, 6:
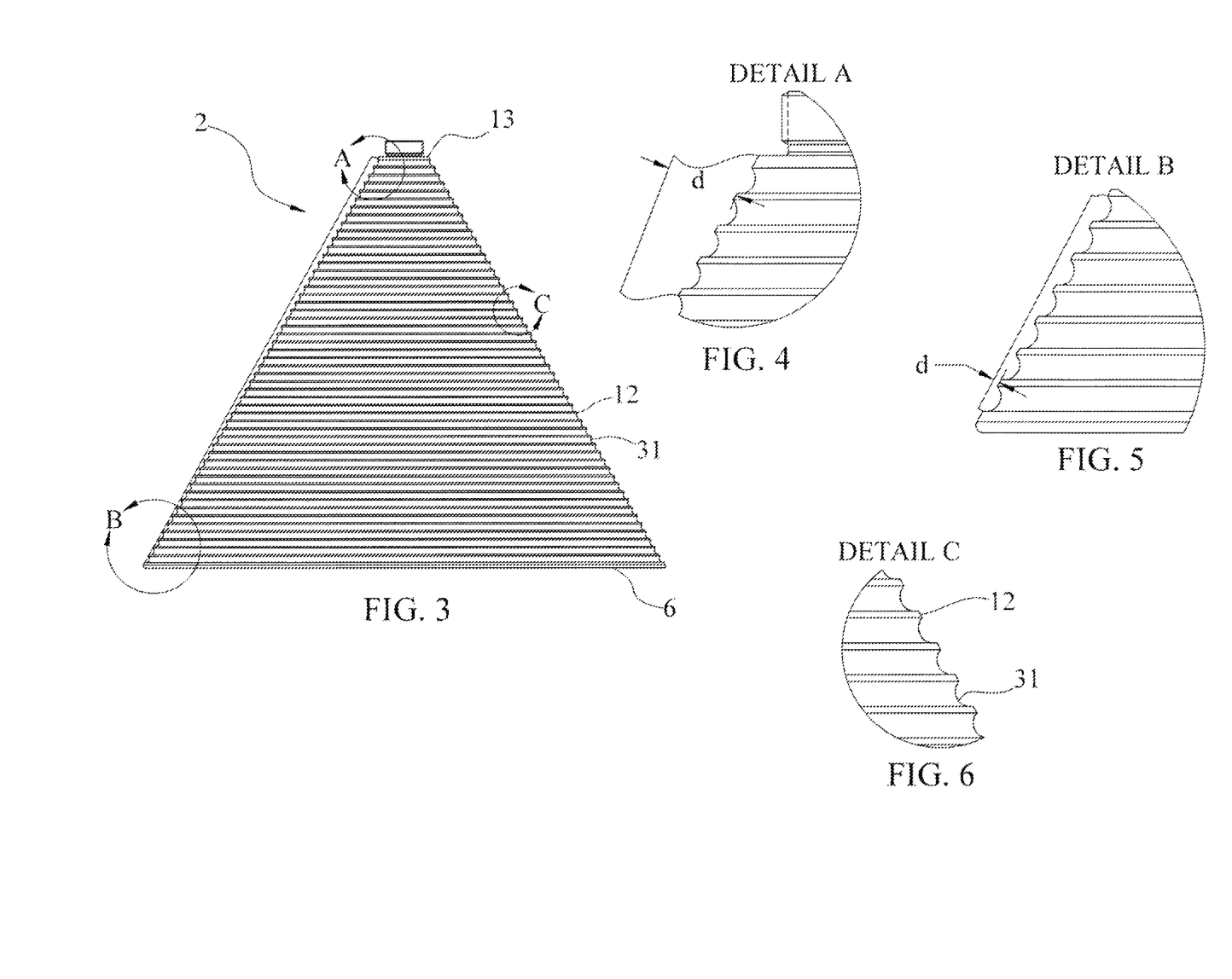
FIG. 3 is a front side view of the frustoconical evaporator in the upright position.
FIG. 4 is a detailed view of the top part of the heatsink shown in FIG. 3 with the depth of a liquid toward the top.
FIG. 5 is a detailed view of the bottom part of the heatsink shown in FIG. 3 with the depth of the liquid toward the bottom.
FIG. 6 is a detailed view of the outside of the heatsink shown in FIG. 3. Showing a profile.

FIG. 3 and FIG. 6 shows in detail the exterior surface 12 of heatsink 2. In this embodiment, the surface 12 is not vertical but is generally frustoconical in shape with the smallest diameter located at the heatsink top 13, and the largest diameter of the surface 12 is located proximal to the bottom surface 6. Frustoconical is understood in the art to generally describe a cone with the tip removed. An example would be a device having the shape of a cone with the narrow end, or tip, removed. Therefore, the sloping exterior surface 12 increases in diameter as it approaches the bottom surface 6.

A liquid radially applied to the top portion 13 will flow downward by gravity onto an ever increasingly larger surface area until the liquid reaches the largest diameter proximal the bottom surface 6. For a fixed flow rate, the depth d of a liquid applied to the surface 12 at the top 13 shown in FIG. 4 will be greater than the depth d of the liquid when it reaches the surface 12 proximal the bottom surface 6 as shown in FIG. 5. This decrease in depth of the supplied liquid is not dependent on any evaporation of the liquid but a result of the increasing circumferential flow area around the heatsink 2 as the diameter increases from the top 13 to bottom surface 6. The exterior of the heatsink 2 also has a series of cascading profiles 31 shown in FIG. 6. Embodiments of these profiles generally run circumferentially around the frustoconical shape of the heatsink 2. The profiles 31 serve multiple functions, as discussed in the embodiments below.

The profiles 31 are constructed in such a manner as to increase the exterior surface 12 areas of the heatsink 2. This increased surface area allows for more efficient heat transfer from the surface 12 to the liquid supplied into the evaporator 1. The profiles 31 also impede the flow of liquid down the exterior to allow for agitation and mixing of the liquid as it flows. The preferred embodiment of cascade profile 31 is a series of continuous scalloped grooves running circumferentially around the exterior as shown in FIG. 3 and FIG. 6, however, the invention is not limited to this profile.

The profile 31 could be a series of discontinuous grooves (not shown) running partially around the exterior. The exterior surface 12 of the heatsink 2 could also be manufactured smooth and then coated with a rough material treatment designed to increase surface area and to impede and mix the downward flow of the liquid. The profile 31 could be any geometry that could produce the effect of increasing surface area and providing agitation of the liquid. The increased surface area increase vaporization by making it easier for the water molecules to vaporize and increases the heat transfer from the heat sink 2 material to the water. The profile 31 would not have to be the same geometry throughout the surface 12 but could be of different sizes, shapes and patterns to optimize the transfer of heat from the surface 12 to the liquid. The geometry is designed to allow the water to quickly and effectively cover the heat sink 2 materials by taking advantage of the principals of cohesion and adhesion.

In one embodiment, shown in FIG. 2, below the heatsink 2 is a brine fluid drain pan 39. By design, not all the supplied liquid entering the evaporator system 1 is evaporated. The unevaporated liquid brine drains down the surface 12 and profiles 31 where it is collected by the pan 39. The liquid collected in pan 39 drains out through brine outlet 15. Unevaporated brine may be channeled from the outlet 15 to testing and sensing instruments not shown for brine density analysis. Although the evaporator 1 shown has only one brine outlet 15, multiple brine outlets 15 could be installed into the pan 39 to create multiple flow paths.

The collected liquid can be either saved outside of the evaporator 1 or it can be reintroduced into the evaporator 1 for reprocessing and energy recapture or to another evaporator 1 being used in series or parallel. The drain pan 39 is connected to the heatsink 2 as a separate component in the preferred embodiment but can be integrally manufactured as part of the heatsink 2. The bottom of the pan 39 can be manufactured to slope downward so the brine drains to the brine outlet 15.

The evaporation rates can be controlled to prevent the water from becoming supersaturated and depositing salts or scale on the surface 12 of the heat sink 2. To prevent scale the water flow rate should be consistent to avoid water settling on the surface 12 of the heat sink 2 for any extended time. Scale can be limited by allowing the water to continuously flow. This can be accomplished with a designed flow pattern that is consistently flowing under gravity. Coatings can be applied to surface 12 of the heat sink 2 to prevent scaling. During periods of inactivity clean freshwater or distilled water can be used to flush any salts away from surface 12 of the heat sink 2.

In the center of the heatsink, 2 is the flow path 7 or venturi for venting the exhaust gases produced by flame 5 as shown in FIG. 2. The flow of the exhaust gases is from the bottom to the top in the upward, vertical direction. The inside diameter of the flow path 7 or venturi is larger proximal the bottom surface 6 and smaller further up the center of the heatsink 2. This decrease in diameter makes the flow area of the flow path 7 or venturi less toward the top 13 than it is toward the bottom surface 6. There can be a gradual decrease in the diameter of the venturi all along the length or there can be a decrease in flow path 7 or venturi inside diameter for only a portion of its length. The wall geometry of the flow path 7 or venturi can be a nonlinear profile based on any optimization of the design.

In an alternative embodiment, the venturi can be replaced with flue gas tunnels of one (flow path) or multiple holes (alternative flow paths) drilled into the heatsink 12. In one embodiment multiple holes can converge at one or more spots above the top half of the frustoconical structure. In theory, this will also more flue gas heat transfer at the bottom where there is more surface 12 area and mass of the heat sink 2. The purpose of the venturi and air supply is to ensure enough air to properly combust the gas and obtain the most favorable efficiency rates.

Proximal the heatsink top 13 of the heatsink 2 is the exhaust pipe 3 shown in FIG. 2. The pipe 3 channels the combustion gases from the flame 5 out from the flow path 7 or venturi to the exhaust outlet 4 of the evaporator 1. Proximal to the vent pipe 3 is the brine supply sink 27. The sink 27 holds the brine being supplied into the evaporator system 1 by the brine supply pipe 9 through the brine supply inlet 10. On the bottom of the brine supply sink, 27 are supply orifices 11 for metering the flow of brine onto the surface 12 by gravitational or other means. Sensors such as TDS and density sensors can be provided to help meter and/or control the brine concentrations.

The level of brine in the brine supply sink 27 can vary. The top level of the brine can be shallow with the atmosphere occupying the volume above the brine. The orifices could also be designed to allow for the entire brine supply sink 27 to be filled with brine and pumped into the sink 27 under pressure. The design and operation can be adjusted to allow more favorable evaporation rates without scaling. Typically, the goal is to produce as much evaporate as possible, without causing scale, as discussed above. Generally, the operator wants brine at the highest density as possible, without creating a supersaturated state that causes precipitation of salts or scaling. In oil and gas, the industry generally requests at least a 10-pound brine which has a density of 10 pounds per gallon or more which is a standard drilling density that drillers either add water to reduce or add denser additives to increase. More preferably the brine should be at least 11 pounds per gallon and even more preferably at least 12 pounds per gallon and most preferably at least 13 pounds per gallon. The higher density brines are more favorable when the brine is crystalized into a solid salt.

The orifices 11 could be nozzles that are removed or machined integrally into the sink 27. Alternatively, the orifices 11 or nozzles could be screens attached to sink 27. The heat produced from the flame 5 is also exhausted through pipe 3. The heat exhausted through the vent pipe 3 can provide a prewarming effect on the brine input into the sink 27 by transferring the heat through the wall of the pipe into the brine surrounding its exterior. This can be accomplished using prewarming heat exchangers such as plate or shell and tube heat exchangers. The exterior of the pipe 3 could have heat transfer fins, not shown, such as a finned tube heat exchanger. The fins can be solid or serrated.

The purposed of the prewarming is to recapture as much energy as possible. The temperature of the discharge brine and the temperature of the condensed vapor should be as close as possible to the intake water temperature. If the intake water temperature and brine discharge and vapor condensate have the same temperature there is 100 percent energy recapture. The energy recaptures hold premature at least 50 percent of the energy, more preferably at least 60 percent, even more preferably at least 80 percent and most preferably at least 90 percent of the energy should be recaptured. Suitable energy recapture devices and systems are disclosed in co-pending U.S. patent application Ser. No. 16/370,739 filed on Mar. 31, 2019, entitled "AN APPARATUS SYSTEM AND METHOD TO EXTRACT MINERALS AND METALS FROM WATER." U.S. patent application Ser. No. 16/370,739 is hereby incorporated by reference in its entirety.

Enclosing the top of the supply sink 27 is a cap 28. This allows for access into the sink 27 for cleaning or attendance of the orifices. Cap 28 may also have a vent (not shown) for venting or equalizing pressure produced within the supply sink 27.

Figures 7, 8, 9:
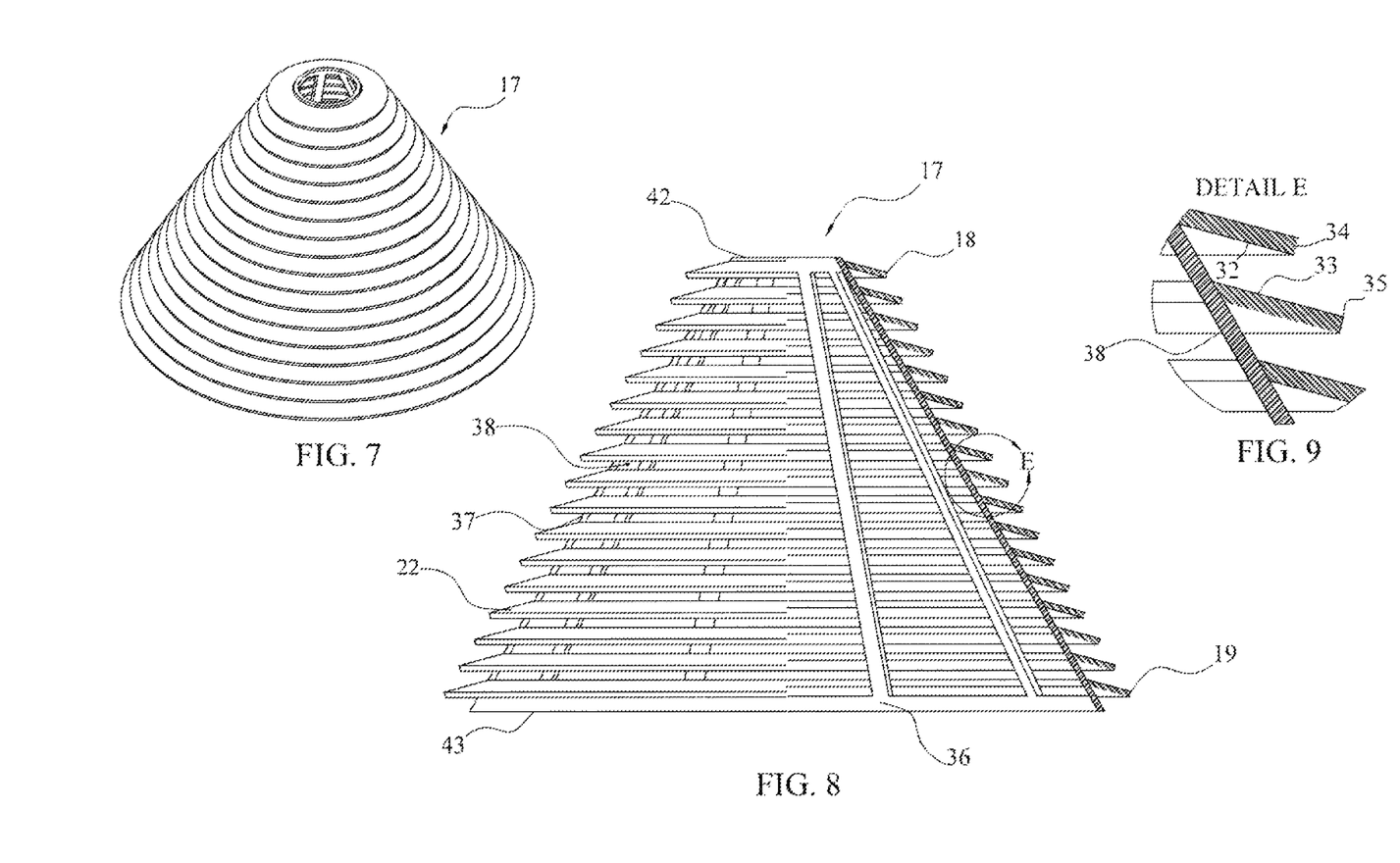
FIG. 7 is an isometric view of the condensation assembly in the upright position.
FIG. 8 is a half section view of the condensation assembly in the upright position.
FIG. 9 is a detail view of the condensation assembly shown in FIG. 8 showing the louvers in detail.

Exterior to heatsink 2 is the condensation assembly 17 shown in FIG. 2, FIG. 7, and FIG. 8. The condensation assembly 17 is generally frustoconical in shape with the smallest diameter at the condensation assembly top 42 and the largest diameter at the condensation assembly bottom 43. The sub-structure of the condensation assembly 17 is cage 36 which supports the series of spaced louvers 22 for collecting the evaporate. The design of stacking the louvers 22 sequentially is to increase the surface area on which the evaporate may collect and condense. Evaporate produced during the heating of the heatsink 2 will tend to flow upward through apertures 38 in the cage 36 formed between the vertical members 37 where it will contact the underside surface 32 of the louvers 22. Not all the evaporate will condense on the louvers 22. Some of the evaporate will flow through the apertures 38 and continue through the spacing between adjacent louvers 22.

Figure 10:
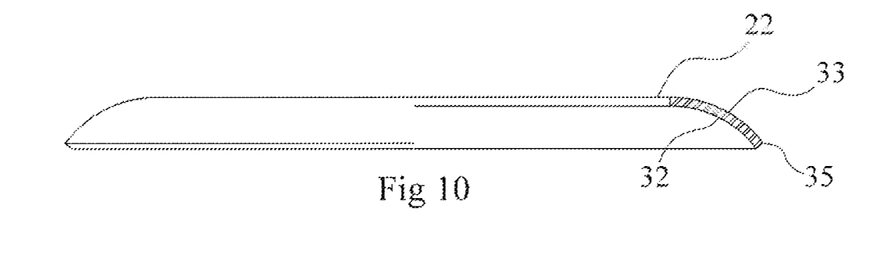
FIG. 10 is a half-section view of a curved shaped louver.
Figure 11:
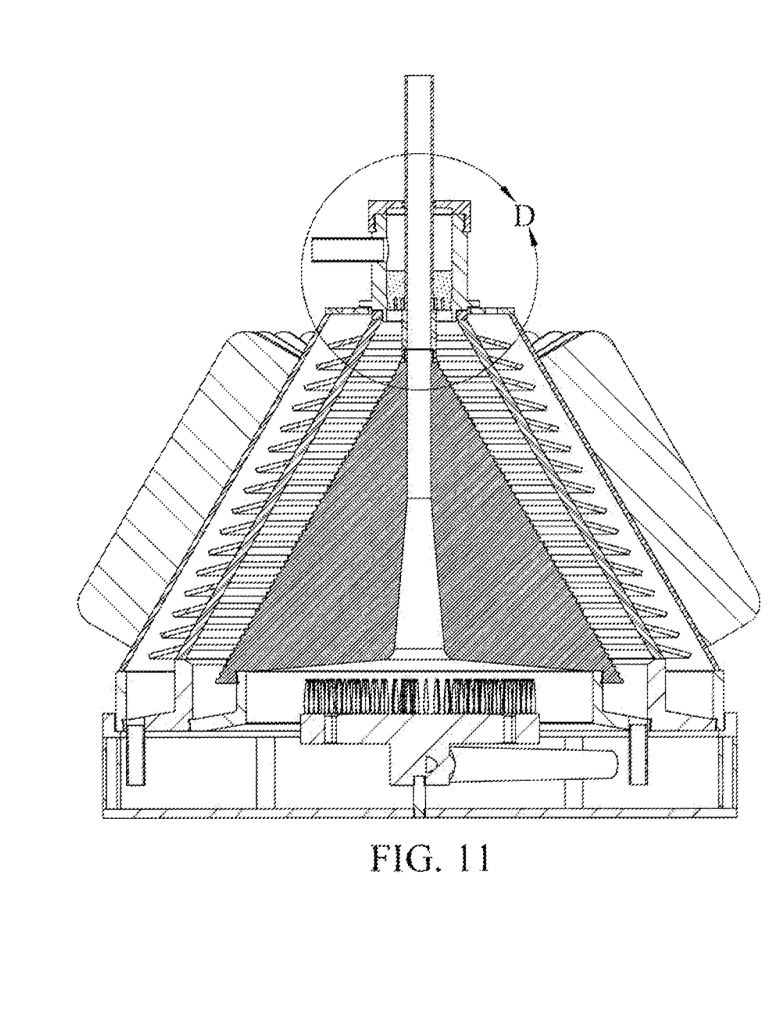
FIG. 11 is a section view of the evaporator system showing brine entering the top.

The evaporate that is collected on the louvers 22 has cooled and is condensation. The series of stacked louvers 22 are different sizes with the largest being the bottom louver 19 at the condensation assembly bottom 43 of the assembly and the smallest being the top louver 18 at the condensation assembly top 42. The louvers 22 are attached to the outside of the cage 36 in the preferred embodiment but can be manufactured with the cage 36 on the outside or be cast with the supporting cage 36 in the radial middle of the louvers 22. In the preferred embodiment, the louvers are dish-shaped and span circumferentially around the cage 36. However, the louvers 22 could be cup-shaped as shown in FIG. 10.

The inner diameter of the louver 22 slopes upward while the outer diameter 34 of the louver 22 slopes downward to allow the condensed evaporate to flow toward the outer diameter 34. Condensed evaporate will collect on the underside surface 32 of each louver 22 and drips down to the topside surface 33 of the next lower adjacent louver 22. Condensed evaporate will continue to flow down over the drip edge 35 located on the outer diameter 34 of the louver 22 an onto the next lower adjacent louver until the condensation reaches the bottom louver 19 of the assembly. Preferably, the design creates as many flow paths or multiple flow paths between the evaporation and condensation surfaces as possible, to allow the greatest amount of vapor separation from the contaminates in the water or contaminates in the fluids as possible. Baffles (not shown) or other devices can be added into the spaces between the condensation assembly 17 and the exterior surface 12 of heatsink 2 to increase the number of flow paths to improve separation of the vapor from the contaminates.

As shown in FIG. 2 below the condensation assembly 17 is the condensation pan 40. In the preferred embodiment, the condensation pan does not contact the brine drain pan 39 directly but is isolated from its heat as much as possible through insulators not shown. Condensation pan 40 collects the condensed evaporate that drips off the bottom louver 19 and is drained out of the condensation pan 40 by the condensation outlet 21 where it is transferred outside the evaporator 1.

Exterior to the condensation assembly 17 is the cover 24 as shown in FIG. 2. The cover 24 is frustoconical shaped with the smaller diameter located at the top and the larger diameter located at the bottom. In one embodiment, the general shape of the heatsink 2, and condensation assembly 17 are matching shapes with the condensation assemble being proportionally larger than the heat sink 2. The space provided between the outer diameter 34 of the louvers 22 and the cover 24 provides a chamber for the uncondensed evaporate to travel until it contacts the inner surface 23 of the cover. Surface 23 supplies a further surface for the evaporate to condense. Condensation formed on the inner surface 23 flows downward to be collected in pan 40. On the outside of the cover and exposed to the atmosphere surrounding the evaporator system 1 are cooling fins 26 as shown in FIG. 1 and FIG. 2.

The fins 26 remove heat from the cover and transfers the heat to the environment. Generally, the air surrounding the evaporator 1 will absorb heat transferred to the fins 26 and be carried away by convective heat transfer. In the preferred embodiment, the fins 26 are arranged to run generally vertical is a circular pattern radially around the exterior of the cover 24 as shown in FIG. 1. Cooling fins 26 are attached to the exterior of the cover 24 by welding, adhesion, or any known method of fastening components that would maximize the heat transfer between the cover 24 and the fins 26. However, they can be designed in any shape, number, or arrangement to provide efficient cooling by those skilled in the art. For example, the fins 26 could be a series of horizontal annular rings attached to the exterior of the cover spaced apart to carry arranged in a generally horizontal fashion.

Alternatively, the fins on the outside of the cover 23, can be replaced with insulation. The purpose of the insulation is to conserve heat and transfer as much of the heat energy to the water flowing surface 12 of the heat sink 2. If the cover is insulated too much, the water may not condense. However, using larger volumes of water will absorb significant amounts of heat to allow condensation with the heat cover insulated. In one embodiment, there would be the ability to place removable cooling fins that can be replaced with insulation depending on the operating conditions and cost of the energy. The conserved energy could then allow for greater energy recapture using an energy recapture device.

Connected to the top of the cover 24 and spanning inward unto the supply sink 27 is the evaporate baffle 29 as shown in FIG. 2. The baffle 29 contains extraction vent 30 to allow for the evacuation of any uncondensed evaporate not condensed by the condensation assembly 17 or cover 24. The vent 30 also allows for the extraction of any unwanted fumes or gases that may migrate from other areas of the evaporator 1. There may be just one or multiple vents 30 arranged in the baffle 29. One extraction method for the uncondensed vapor or unwanted gases is to provide a pressure outside the evaporator 1 that is less than the pressure inside the system by a device such as a vacuum, not shown, producing a negative pressure differential to drive the flow of the vapor or gas out of the evaporator system through a conduit and into a collection device. The conduit between the evaporator 1 and a collection device, not shown, could contain cooling coils to aid in condensation of any vapor extracted. In this embodiment, the pressure inside the evaporator 1 is typically less than 1 bar, more preferably less than 0.9 bars, even more preferably less than 0.7 bars and most preferably less than 0.5 bars.

Below the evaporator system, 1 is support stand 41. Stand 41 is a framework necessary to support the evaporator 1 and to allow clearance for drainage from outlets 15, 21 and supply gas to burner 16. Support stand 41 also can act as a framework to attach enclosure devices not shown including insulation to enclose the underside of the evaporator 1.

In practice, the method of operation of the evaporator system 1 is as follows. The energy in the form of heat is added to the evaporator 1 by way of burning gas as flame 5 as shown in FIG. 2. Most of this heat is transferred to heatsink 2 and top surface 12. Another portion of the heat from flame 5 exits the evaporator 1 by why of the exhaust gases flowing through exhaust pipe 3 and exhaust outlet 4. The small remainder of the heat produced by flame 5 is radiated or conducted to other components.

Figure 12:
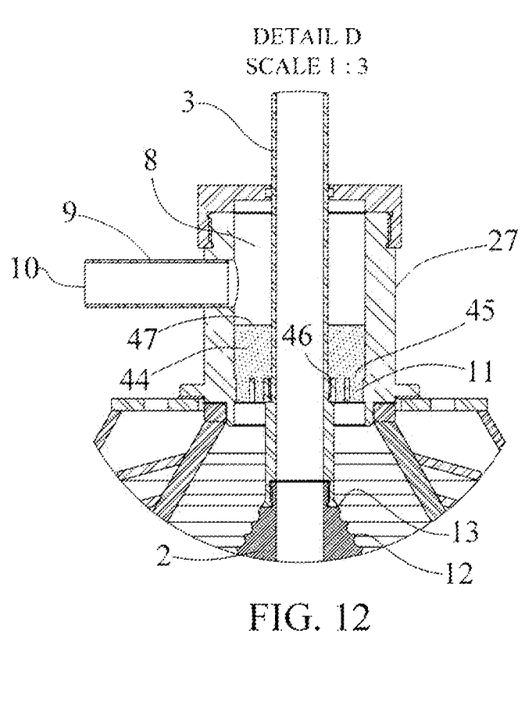
FIG. 12 is a detail view of the top section of FIG. 11 showing brine entering the evaporator system and the process of metering the flow rate.

Contaminated water produced from oil wells is prefiltered to remove undissolved solids, heavy metals, and chemicals by known methods. The remaining contaminated water contains dissolved salts and is known as brine. As best seen in FIG. 12, supply brine 44 enters the evaporator 1 towards the top through brine supply inlet 10 of brine supply pipe 9.

The supply brine 44 in supply pipe 9 is discharged into the brine supply chamber 8 of supply sink 27 at the desired flow rate to maintain the desired brine level 47 within the chamber 8. Another method of supplying brine into the evaporator 1 is to fill the brine supply chamber 8 of sink 27 with supply brine 44 and pump the fluid at a designed applied pressure. Nozzles or orifices 11 located in the lower surface 46 of the supply sink 27 meters the fluid flowing onto the top 13 of the heatsink 2 outer surface 12. In one embodiment the walls of the brine supply chamber 8 are sloped (not shown) to prevent the supply brine 44 from not flowing or siting which could lead to scaling.

The pressure of the supply brine 44 at the orifice inlet 45 of the orifice 11, the geometry of the orifice 11, and the properties of the supply brine 44 control the flow rate of fluid through the evaporator 1. If no pressure is applied at the inlet 10, the pressure of the fluid at the orifice inlet 45 is dependent upon the brine level 47 and the specific gravity of that brine. If the pressure is applied to the inlet 10, the pressure of the supply brine 44 going at orifice inlet 45 is a combination of the brine level 47 in the supply sink 27, the specific gravity of that supply brine 44, and the applied pressure at brine supply inlet 10.

Some of the supply brine 44 in chamber 8 contacts the outside of exhaust pipe 3. Since the exhaust gases in the vent pipe, 3 are hot and heat is transferred from the gases to the vent pipe 3, heat is then transferred from vent pipe 3 to the supply brine 44 waiting to drip down through the orifices 11. This preheating of the supply brine 44 serves to recapture some of the lost heat in the exhaust gases.

The flow of supply brine 44 from the outlet of the orifices 11 onto the surface 12 of heatsink 2 flows by gravity. As best illustrated in FIG. 4 and FIG. 5, the surface area of the heatsink 2 at the top 13 is less than the surface area further down the heat sink 2 so the fluid depth d gradually decreases as the brine flows down the surface 12. Heat transferred to the brine from the surface 12 of the heatsink 2 causes the brine to increase in temperature. Profiles 31 located on the exterior surface 12 of the heatsink 2 functions to agitate the brine as it flows down toward the bottom surface 6 location of the heatsink 2. This agitation encourages more of the brine to be exposed to direct contact with the surface 12 to increase heat transfer from the heatsink 2 to the brine.

The addition of profiles 31 also increases the surface of the heatsink 2 to more area than a surface without profiles 31, thus increasing the potential for heat transfer. The temperature of the heatsink 2 is higher toward the bottom surface 6 than the top 13 because it is closer to the flame 5. As the brine flows downward over the surface 12 and profiles 31, the area of surface 12 increases causing the depth d of the brine to decrease and the temperature to increase. As the temperature of the brine increases the evaporation rate increases. As best seen in FIG. 2, the brine that is not evaporated will flow by gravity into the brine collection chamber 14 where it flows out of the evaporator 1 at brine outlet 15. In practice, the collected brine that flows out of outlet 15 will be tested for properties such as brine concentration or density by instruments not shown. Collected brine from outlet 15 can then be either stored or processed again by the evaporator 1 or another evaporator 1 connected in series.

As best envisioned in FIGS. 8 and 9, the evaporate starts to collect on the surfaces 32, 33 of the louvers 22 in the form of liquid purified water condensation. The condensation formed on surface 33 will flow downward by gravity over the drip edge 35 and on onto the next louver 22 below. Likewise, condensation formed on surface 32 will flow downward by gravity until it drips onto a next lower louver 22. This cascading of condensation will continue down onto the next lower louver to be combined with the condensation that was formed on that next lower louver. This process of condensation forming on the louvers 22 and flowing downward will continue until the liquid reaches the bottom louver 19 where it will flow or drip into the condensation collection chamber 20. Purified water collected in chamber 20 will flow out of the evaporator system 1 through condensation outlet 21 and onto testing, further processing or storage by devices not shown.

Not all the evaporate formed by heating from heatsink 2 will condense on louvers 22. As best envisioned in FIG. 2, some of the evaporate will bypass the condensation assembly 17 through apertures 38 shown in FIGS. 8 and 9 where a portion will condense on the cover inner surface 23 of the cover 24. The condensation formed on surface 23 is in the form of purified liquid water and will either drip down onto the louvers 22 of condensation assembly 17 below to be added to the condensation already there or run downward on surface 23 into the collection chamber 20 where it will exit the evaporator system 1 through outlet 21. Preferably, the louvers 22 are curved to allow the condensation formed to flow rapidly and avoid scale if there is any residual salt left.

Heat energy is absorbed by the evaporate during the liquid to the gas transformation process and the heat must be released by the evaporate when it is cooled or condensed as condensation. The heat given off by the condensing liquid is absorbed by the louvers 22 and other components of the condensation assembly and the cover 24. Therefore, it is expedient to transfer the heat absorbed by the condensation assembly and cover out of the evaporator 1 by cooling fins 26. If necessary, fins 26 located on the cover exterior surface 25 are exposed to air that surrounds the evaporator 1. In the preferred method, heat transfer from the cooling fins 26 to the surrounding air. However, a forced-air device could force air on the fins 26 to increase the convectional heat transfer of the heat away from the fins 26 could be used when ambient conditions are not favorable for desired heat dispersion. The forced air if hot enough can be used in a pre-warmer heat exchanger to prewarm the feed to recapture the energy and improve overall energy efficiency of the system.

There are components, devices, and procedures not shown that could be performed to the fluid including water, contaminated water, produced water, saltwater brackish water, or brine entering and exiting the evaporator 1 that are not part of the invention but may be provided or performed to facilitate the intended use of the embodiments discussed herein. All such devices and procedures are intended to be within the scope of the invention, as claimed.

Figure 13:
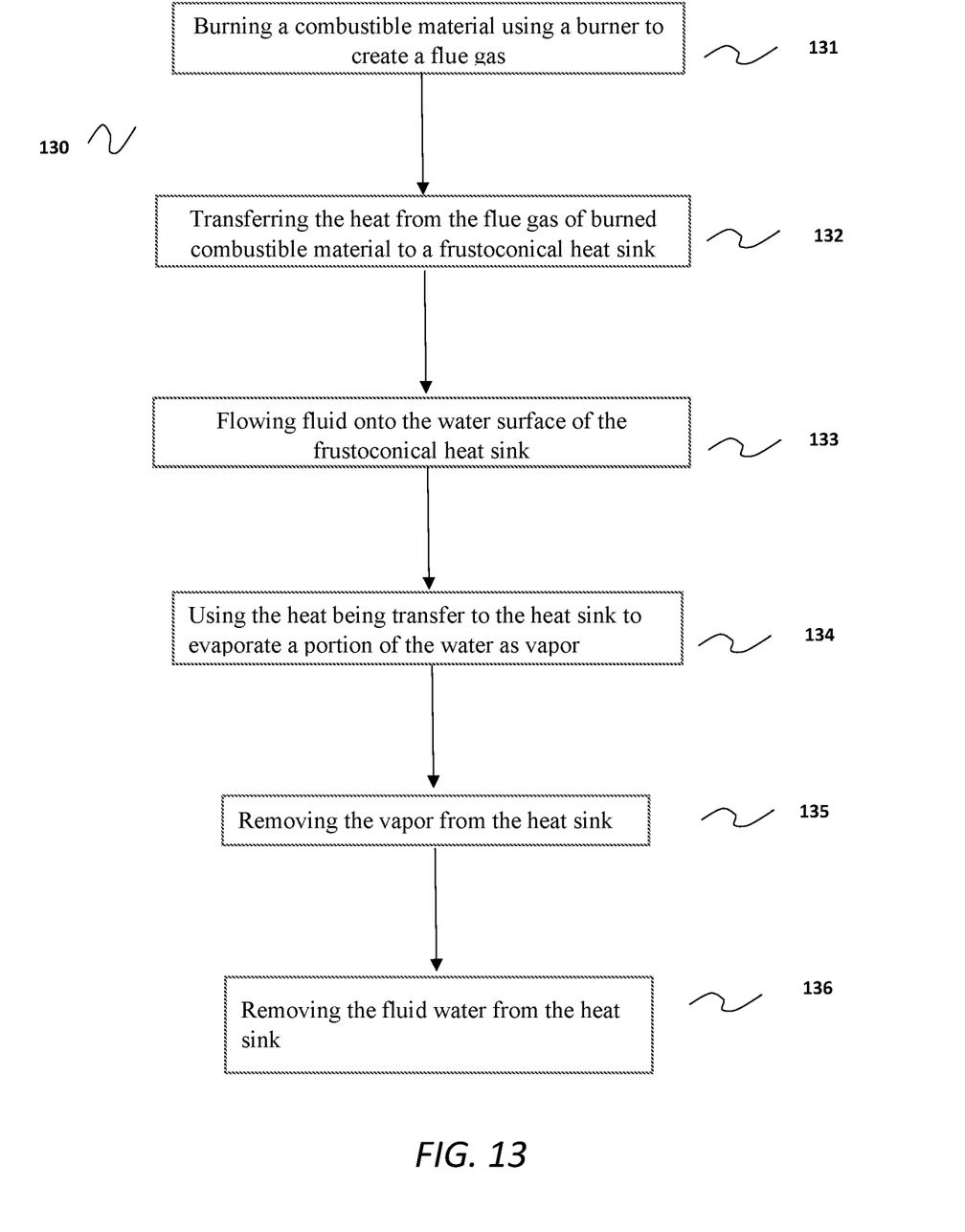
FIG. 13 is a flow chart of a method embodiment.

Method:

FIG. 13 is a flow chart of a method embodiment. As shown in FIG. 13, that method embodiment comprises 6 steps 130. First, a combustible material using a burner creates a flue gas 131. Second, heat from the flue gas of burned combustible material is transferred to a frustoconical heat sink 132. Third, fluid flows onto the water surface of the heat sink 133. Fourth a heat sink is used to transfer heat to evaporate a portion of the water as vapor 134. Fifth, the vapor is removed from the heat sink 135. Sixth, the fluid water is removed from the heat sink 136. Additional steps (not shown) in FIG. 13 include monitoring filtering contaminants from the vapor and monitoring the salt concentration of the unevaporated brine.

System:

An evaporation system can be utilized with the invention, as disclosed. The evaporation system uses temperature sensors on the evaporator in coordination with the gas supply or heat supply and fluid flow to control the water evaporation process in a coordinated manner using a control system. Suitable control systems are disclosed in co-pending U.S. patent application Ser. No. 16/370,739 filed on Mar. 31, 2019, entitled "AN APPARATUS SYSTEM AND METHOD TO EXTRACT MINERALS AND METALS FROM WATER." U.S. patent application Ser. No. 16/370,739 is hereby incorporated by reference in its entirety. In one embodiment, at least one sensor for determining salt concentration of the unevaporated brine; and a control system for controlling the fluid into the system based on the at least one sensor for determining the salt concentration of the unevaporated brine to control the density of the brine. Other sensors can include temperature sensor, fluid flow sensors, pressure sensors, water quality testing sensors, and combinations thereof.

In one embodiment, the control system can run the entire apparatus at a hydrocarbon producing well site including conducting all the method steps completely remotely with an operator offsite or be operated by a computer using artificial intelligence and/or machine learning. A system using artificial intelligence and/or machine learning would improve over time and could be more efficient and cost effective than manual or human operated devices.

What is claimed is:

1. An apparatus comprising:
A frustoconical heat sink comprising a cavity from a bottom surface to a top surface of the frustoconical heat sink;
a burner for burning combustible material below the frustoconical heat sink;
an inlet for fluid to contact a surface of the frustoconical heat sink;
a condensation assembly, the condensation assembly comprising a generally frustoconical shape with a smallest diameter at the condensation assembly top and a largest diameter at the condensation assembly bottom;
a first outlet for vapor to exit the surface of the frustoconical heat sink; and
an outlet for the fluid remaining to exit from the apparatus.

2. The apparatus of claim 1, further comprising a plurality of profiles that are formed circumferentially around a frustoconical shape of the frustoconical heat sink.

3. The apparatus of claim 1, further comprising a plurality of louvers on the condensation assembly to allow fluid to flow over the plurality of louvers.

4. The apparatus of claim 3, wherein the louvers comprise an inner diameter and the inner diameter of the louver slopes upward while an outer diameter of the louver slopes downward.

5. The apparatus of claim 1, wherein the heat sink shape and condensation assembly shape are matching shapes with the condensation assembly being proportionally larger than the heat sink.

6. The apparatus of claim 1, further comprising an energy recapture device for recapturing energy.

7. The apparatus of claim 1, wherein the apparatus forms an evaporate from the fluid with profiles, wherein the profiles are the exterior surfaces that run circumferentially around the frustoconical shape of the heat sink.

8. The apparatus of claim 1, wherein the apparatus is connected to water handling equipment for processing, transporting, and storing water on an oil or gas well site and the fluid is produced water and the fluid remaining is brine.

9. A method comprising:
burning a combustible material using a burner to create a flue gas;
transferring the heat from the flue gas of burned combustible material to a frustoconical heat sink, the frustoconical heat sink comprises a condensation assembly, the condensation assembly comprising a generally frustoconical shape with a smallest diameter at the condensation assembly top and a largest diameter at the condensation assembly bottom;
flowing fluid onto a water surface of the frustoconical heat sink;
using the heat being transferred to the frustoconical heat sink to evaporate a portion of the fluid as vapor;
removing the vapor from the frustoconical heat sink; and
removing the fluid remaining from the frustoconical heat sink.

10. The method of claim 9 further comprising condensing the vapor using the condensation assembly on an the exterior of the heat sink, wherein the condensation assembly forms condensation on a surface of the condensation assembly.

11. The method of claim 9 further comprising filtering contaminants from the vapor.

12. The method of claim 9 further comprising monitoring a salt concentration of the fluid remaining.

13. The method of claim 9 further comprising forming an evaporate from the fluid with profiles, wherein the profiles are the exterior surfaces that run circumferentially around the frustoconical shape of the heatsink.

14. The method of claim 9 further comprising connecting the frustoconical heat sink to water handling equipment for processing, transporting, and storing water on a hydrocarbon producing well site and wherein the fluid is produced water and the fluid remaining is brine.

15. A system comprising:
a frustoconical heat sink comprising a cavity from a bottom surface to the top surface of the frustoconical heat sink;

a burner for burning combustible material below the frustoconical heat sink;

an inlet for fluid to contact a surface of the frustoconical heat sink;

a first outlet for vapor to exit the surface of the frustoconical heat sink;

a condensation assembly, the condensation assembly comprising a generally frustoconical shape with a smallest diameter at the condensation assembly top and a largest diameter at the condensation assembly bottom;

an outlet for the fluid remaining to exit from the system;

at least one sensor for determining salt concentration of the fluid remaining; and a control system for controlling the fluid flow rate into the system based on the at least one sensor for determining the salt concentration of the fluid remaining to control the density of the brine.

16. The system of claim 15, further comprising a temperature sensor connected to the control system.

17. The system of claim 15, further comprising profiles, wherein the profiles are the exterior surfaces that run circumferentially around the frustoconical shape of the heat sink.

18. The system of claim 15, wherein the frustoconical heat sink is connected to water handling equipment for processing, transporting, and storing water on a hydrocarbon producing well site and the fluid is produced water and the fluid remaining is brine.

19. The system of claim 16, wherein the system is operated remotely using the control system.

* * * * *